United States Patent [19]
Holland et al.

[11] Patent Number: 5,862,638
[45] Date of Patent: Jan. 26, 1999

[54] SEISMIC ISOLATION BEARING HAVING A TENSION DAMPING DEVICE

[75] Inventors: Rodney H. Holland, Novato; Douglas G. Burgess, Martinez; William H. Strobel, Santa Rosa; David H. Hanson, Vallejo, all of Calif.

[73] Assignee: Applied Structures Technology LLC, Novato, Calif.

[21] Appl. No.: 648,220

[22] Filed: May 13, 1996

[51] Int. Cl.⁶ .................................................. E04B 1/98
[52] U.S. Cl. ........................ 52/167.8; 248/562; 248/636
[58] Field of Search ........................... 52/167.4, 167.7, 52/167.8; 248/562, 636, 638

[56] References Cited

U.S. PATENT DOCUMENTS

| | | | |
|---|---|---|---|
| 3,418,768 | 12/1968 | Cardan | 52/167 |
| 3,606,704 | 9/1971 | Denton | 52/167 |
| 3,691,712 | 9/1972 | Bowling et al. | 52/393 |
| 3,794,277 | 2/1974 | Smedley et al. | 52/167.4 X |
| 4,402,483 | 9/1983 | Kurabayashi et al. | 248/636 |
| 4,577,826 | 3/1986 | Bergstrom et al. | 248/638 |
| 4,593,502 | 6/1986 | Buckle | 52/167 |
| 4,617,769 | 10/1986 | Fyfe et al. | 52/167 |
| 4,805,359 | 2/1989 | Miyake et al. | 52/167 |
| 4,830,927 | 5/1989 | Fukahori et al. | 428/495 |
| 4,899,323 | 2/1990 | Fukahori et al. | 367/176 |
| 4,910,930 | 3/1990 | Way | 52/167 |
| 4,922,667 | 5/1990 | Kobori et al. | 52/167 |
| 4,933,238 | 6/1990 | Fukahori et al. | 428/495 |
| 4,941,640 | 7/1990 | Nakamura et al. | 248/562 |
| 4,978,581 | 12/1990 | Fukahori et al. | 425/492 |
| 5,014,474 | 5/1991 | Fyfe et al. | 52/167 |
| 5,201,155 | 4/1993 | Shimoda et al. | 52/167 |
| 5,373,670 | 12/1994 | Sasaki et al. | 52/167.7 |
| 5,375,382 | 12/1994 | Weidlinger | 52/167 |
| 5,386,671 | 2/1995 | Hu et al. | 52/167 |
| 5,490,356 | 2/1996 | Kemeny | 52/167.7 |

*Primary Examiner*—Carl D. Friedman
*Assistant Examiner*—Beth A. Aubrey
*Attorney, Agent, or Firm*—Timothy M. Schaeberle

[57] ABSTRACT

The present invention is directed to a seismic isolation bearing having an ultimate translational distance and capacity for supporting an upper structure on a lower structure, comprising a load bearing core for absorbing forces which causes a horizontal sliding movement between the upper structure and the lower structure, an upper load bearing plate positioned on top of the uppermost load bearing body and a lower load bearing plate positioned beneath the lowermost load bearing body. The bearing further includes a tension damping device comprising a matrix material and a reinforcement material disposed therewithin and having an activation point and range. Each tension damping device is adapted to be connected between the upper load bearing plate and the lower load bearing plate for damping and stiffening the sliding movement between the upper and lower structures.

13 Claims, 14 Drawing Sheets

SEISMIC ISOLATION BEARING HAVING A TENSION DAMPING DEVICE

FIELD OF THE INVENTION

The present invention relates to a seismic isolation bearing and more particularly to an improved seismic isolation bearing comprising a damping and stiffening tension device for use on structures which are subjected to seismic forces.

BACKGROUND OF THE INVENTION

Translation type isolation bearings, or bearings that are relatively rigid in one direction and relatively flexible in the two orthogonal directions, consist of at least a core of horizontally sliding or translating surfaces or materials that reduce the transmitted vibration energy. At the same time, the core is also capable of carrying the vertical gravity loads of the structure.

In the case of seismic isolation bearings, movement at the base of the bearing is associated with earthquake ground motion. The maximum possible translation that might be imposed on the isolation devices is not well understood because there is disagreement on the maximum potential ground motions. It is believed that the worst case ground motion would be adjacent to the terminating end of a slipping fault line. But incomplete understanding of the potential effects of geologic factors, such as fault size and type, as well as limited localized information, such as fault locations or soft soil conditions, reduce the accuracy of maximum bearing displacement estimates at a specific site. Therefore, it is considered prudent to guard against unexpected bearing failure, caused by unexpectedly high bearing displacements, that may lead to sudden loss of structure support.

At present, control of maximum bearing displacements is accomplished by utilizing a variety of means, including: (1) designing overly stiff bearings; (2) relying on increasing elastomer stiffness with strain; (3) adding hydraulic type dampers or pistons in parallel with the bearings; (4) providing metal chains, cables or rods to stop the bearings; (5) providing auxiliary friction sliding devices that provide increasing friction resistance with bearing translation; and, (6) providing stabilizing columns that "catch" the building if the bearings should fail.

Representative bearings having maximum bearing displacement control include U.S. Pat. Nos. 4,910,930 (Way) and 5,014,474 (Fyfe et al.). Way discloses a seismic isolation structure comprised of a high damping elastomeric bearing and a restraint means mounted between a building's footings and support columns. This restraint means is comprised of a curled steel rod located outside the bearing core. Fyfe discloses an apparatus having a low friction elastomeric load bearing pad disposed between an upper and lower load bearing plate and a freely disposed restraining means, such as a steel cable or chain, in an axial bore through the center of an elastomeric bearing and attached to the upper and lower load bearing plates.

Although capable of handling unexpected inputs, conventional displacement controlled bearings do not exhibit an optimized design capable of handling expected inputs. In the case of a displacement controlled seismic isolation bearing, an optimum bearing design would entail one in which structure accelerations are reduced as much as possible for typical, expected ground motions ranging in scale from Richter Magnitude 5 to 7, and failure is prevented in extreme, unexpected ground motions, or those greater than Richter Magnitude 8.

Bearings having displacement control, to date, are deficient in their design and function for a number of reasons, including: (1) overly stiff bearing cores reduce isolation effectiveness in the expected input range; (2) elastomer stiffness increase with strain is too slow to prevent displacement bearing failure; (3) hydraulic or similar viscous systems are expensive and overly stiffen the bearing, reducing its effectiveness; (4) friction sliding devices tend to be unreliable because they depend on long-term, consistent stick-slip action at the sliding surfaces and are sensitive to normal or vertical force which varies in a dynamic and complicated way; and (5) steel cables, chains, springs or rods generate a sudden impact load on the structure when they become taut and typically do not return to their initial configuration after becoming taut.

SUMMARY OF THE INVENTION

In view of the aforesaid drawbacks of the conventional displacement controlled seismic isolation bearings, it is an object of the present invention to provide an improved seismic isolation bearing capable of being optimized for expected inputs, while at the same time remaining protected from failure caused by the extreme inputs. This effect is achieved through employing a tension damping device that gradually imparts an increased stiffness and damping to the bearing assembly when required, but otherwise does not affect the operational characteristics of the bearing.

Accordingly, the present invention is directed to a seismic isolation bearing having an ultimate translational length and capacity for supporting an upper structure on a lower structure, comprising a load bearing core for absorbing forces which causes a horizontal sliding movement between the upper structure and the lower structure, an upper load bearing plate positioned on top of the uppermost load bearing body and a lower load bearing plate positioned beneath the lowermost load bearing body. The bearing further includes a tension damping device (referred to herein as a TDD) comprised of a matrix material and reinforcing material disposed therewithin and having an activation point and range. Each tension damping device is adapted to be connected between the upper load bearing plate and the lower load bearing plate for damping and stiffening the sliding movement between the upper and lower structures.

The TDD employed herein exhibits the following characteristics; high strength, adjustable activation points and ranges, and a gradual and smoothly increasing stiffness and energy damping. Furthermore, the TDD controls the maximum displacement but does not affect actual bearing behavior prior to becoming active, thus allowing the bearing to be optimized for expected inputs while the gradual stiffening and damping effect may be relied on to prevent bearing failure in unexpected events. An example of such bearings are seismic isolation bearings which are preferably optimized for seismic ground motions less than approximately a Richter Magnitude of 7 to 8, but which may be subjected to larger ground motions in some circumstances, i.e. those seismic motions adjacent to fault lines.

Generally, employing tension damping devices as the means of displacement control in the inventive seismic isolation bearings provides the following advantages over employing the aforementioned conventional displacement control means: 1) the TDD gradually stiffens and thereby avoids transmitting sudden impacts as may occur with cable, rod or chains; 2) the TDD provides damping energy losses; 3) the TDD has a recoverable and repeatable stiffening factor; 4) the TDD exhibits an adjustable activation point and range; 4) the TDD behavior is more predictable because it is based on the simple operational principal of axial force; 5) the TDD is more easily tested, installed, serviced and detached.

BRIEF DESCRIPTION OF THE DRAWINGS

as illustrated in FIG. 6;

DETAILED DESCRIPTION OF THE INVENTION

Figure 1:
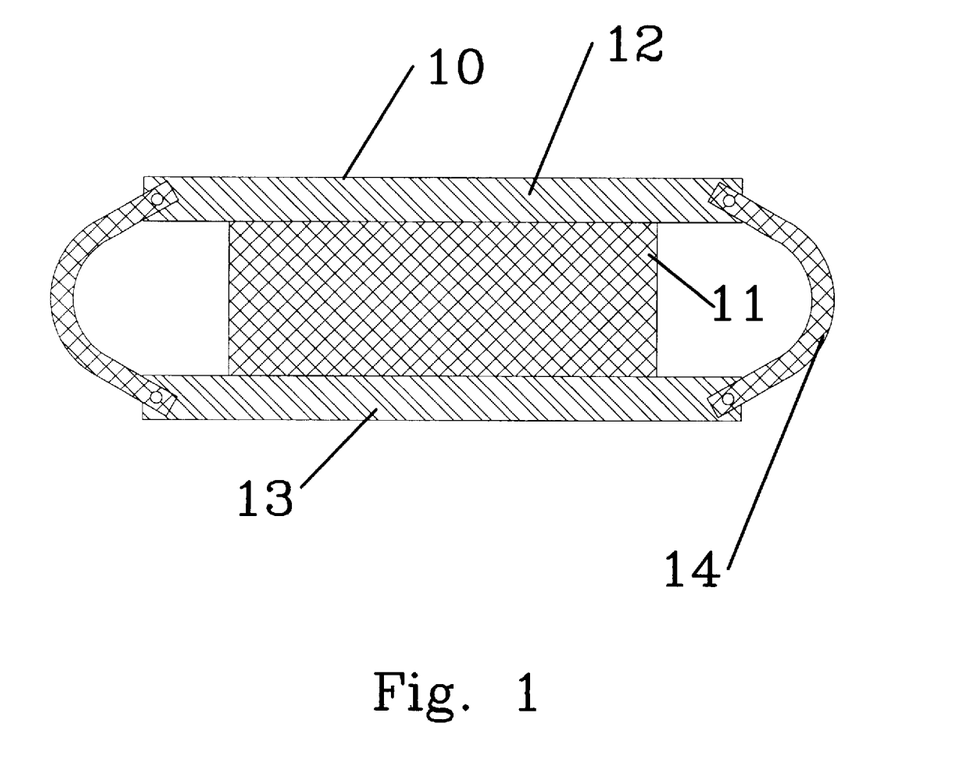
FIG. 1 is a vertical cross-sectional view of an inventive seismic isolation bearing according to an embodiment of the present invention.

FIG. 1 generally illustrates a seismic isolation bearing embodying the present invention, having an ultimate translational distance and capacity for supporting an upper structure on a lower structure (both not shown). Bearing 10 comprises a load bearing core 11 for absorbing forces which causes a horizontal sliding movement between the upper structure and the lower structure. Structure as referred to herein includes buildings, bridges and equipment as well as other structures and their components, which are subject to seismic vibrations or the like. Bearing 10 further includes an upper load bearing plate 12 positioned on the top surface of the load bearing core and a lower load bearing plate 13 positioned on the bottom surface of the load bearing core. Lastly, bearing 10 includes at least two, tension damping devices (TDD) 14 comprised of a matrix material and reinforcing material disposed therewithin and having an activation point and range. Each TDD is connected to, and between, upper load bearing body 12 and lower load bearing body 13 by a suitable manner. In the embodiment illustrated therein TTD's exhibit an arcuate shape.

In general, the TDD's may vary in length, diameter, composition, number, and in their attachment to the bearing core in order to optimize the behavior of a particular isolation bearing.

Specifically, any TDD should exhibit a length whereby the activation of the TDD (its activation point) occurs at some point prior to the bearing core reaching it's ultimate translation capacity at which point the bearing core begins to fail or become unstable due to either tearing or buckling. It is at this activation point when the TDD begins providing its characteristic stiffening and damping.

The thickness and composition of a TDD are selected depending on the required strength and stiffness for the desired bearing application. For higher strength TDD's a thicker TDD, with an increased amount of, or with a stronger, reinforcing material is selected. For stiffer TDD's, a stiffer matrix or reinforcing material is used and/or the wrapping angle of the reinforcing material is changed.

The matrix material employed in the TDD may include any natural and or synthetic rubbers which are capable of being cured or vulcanized utilizing the combination of heat and suitable vulcanizing agents and which exhibit characteristic properties which will make it suitable for use as a tension damping device in an isolation bearing application.

Representative matrix or elastomeric materials include common rubbers such as ethylene-propylene rubber, nitrile rubber, butyl rubber, halogenated butyl rubber, chloroprene rubber, natural rubber, isoprene rubber, styrene-butadiene rubber, butadiene rubber, acrylic rubber, ethylene-vinyl acetate rubber and polyurethane rubber, special rubber such as epoxied natural, fluororubber, ethylene-acrylic rubber, polyester elastomer, epichlorohydrine rubber, and chlorinated polyethylene. These rubber materials may be used alone or in combination with one another. In addition, they may be incorporated with additives such as thermoplastic and thermosetting resins, filler, tackifier, slip agent, antioxidant, antiozident, plasticizer, softening agent, low molecular weight polymer, fire retardant and oil which are commonly used for plastic processing to impart desired hardness, loss characteristics, and durability according to the object of use.

Generally, the reinforcing material utilized can be any material which exhibits at least an elastic modulus and strength of at least 5 times greater than that exhibited by the surrounding matrix material. Metal reinforcing materials include ferrous and non ferrous metals and alloys thereof such as iron, copper, aluminum, brass, tin and similar metals. Preferably, a high strength, cold drawn steel may used for the reinforcing material because of its characteristic high strength and stiffness. Non-metal reinforcing materials may include, kevlar, nylon, fiberglass, polypropylene, orlon or rayon.

Figure 2:
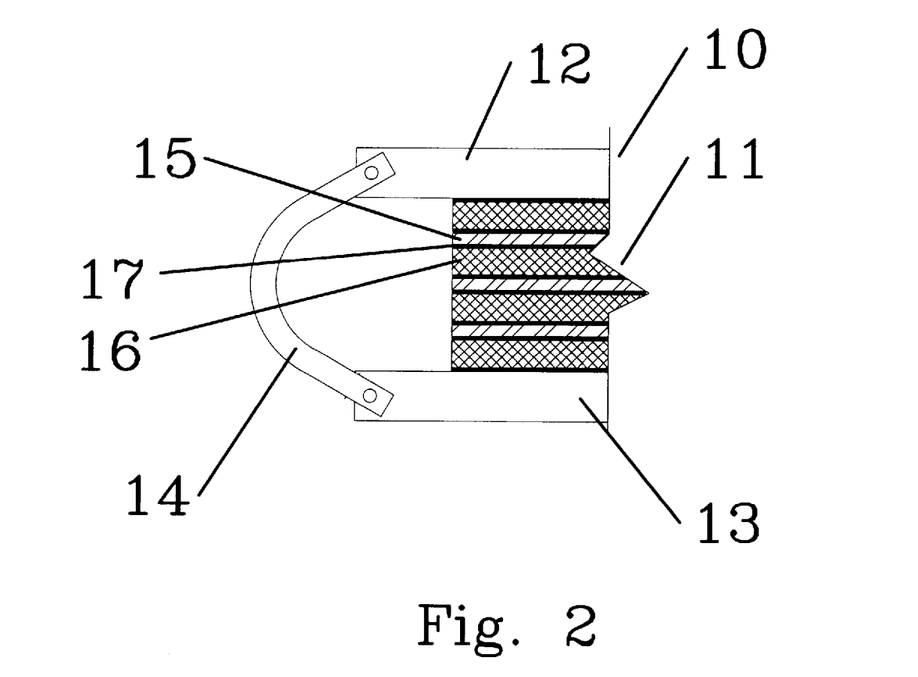
FIG. 2 is a partial vertical cross-sectional view of another embodiment of the seismic isolation bearing.

FIG. 2 illustrates one embodiment of the bearing 10 comprising a metal elastomer laminate core 11 exhibiting alternately layered metal 15 and elastomer 16 substrates having a layer of adhesive 17 disposed therebetween. Tension damping device 14 is adapted to be attached to the upper and lower load bearing plates. The metal substrates preferably exhibit a uniform thickness of between about 0.02 to 0.5 inches, while the elastomer substrates preferably exhibit a thickness between 0.05 to 2.0 inches thick. Any room-temperature curing adhesive exhibiting the following requisite properties will be suitable—a thixotropic, trowelable viscous paste with a working life of at least about 60 minutes, an elongation at failure of approximately 2–15%, a tensile strength of at least 3,000 psi and an adhesive strength of at least 1000 psi. In other words, many commercially available structural epoxy adhesives may be suitable.

Figure 3:
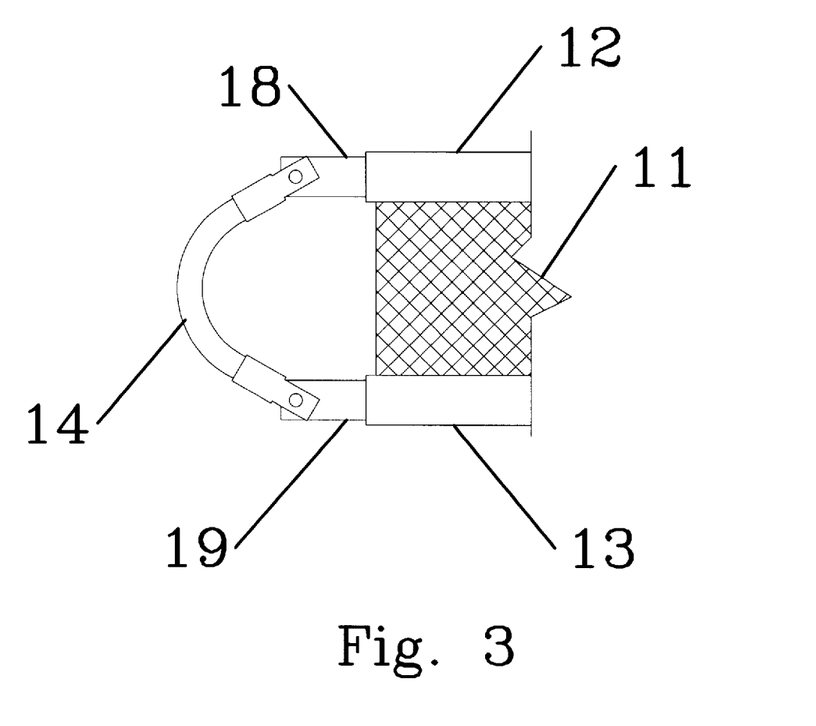
FIG. 3 is a partial vertical cross-sectional view illustrating one embodiment of tension damping device attachment.

Referring now to FIG. 3 illustrated therein is one embodiment of attaching the tension damping device; the TDD 14 is attached to an upper pivot 18 and a lower bearing pivot 19 which are attached directly to the upper load bearing body 12 and the lower load bearing body 13, respectively.

Figure 4:
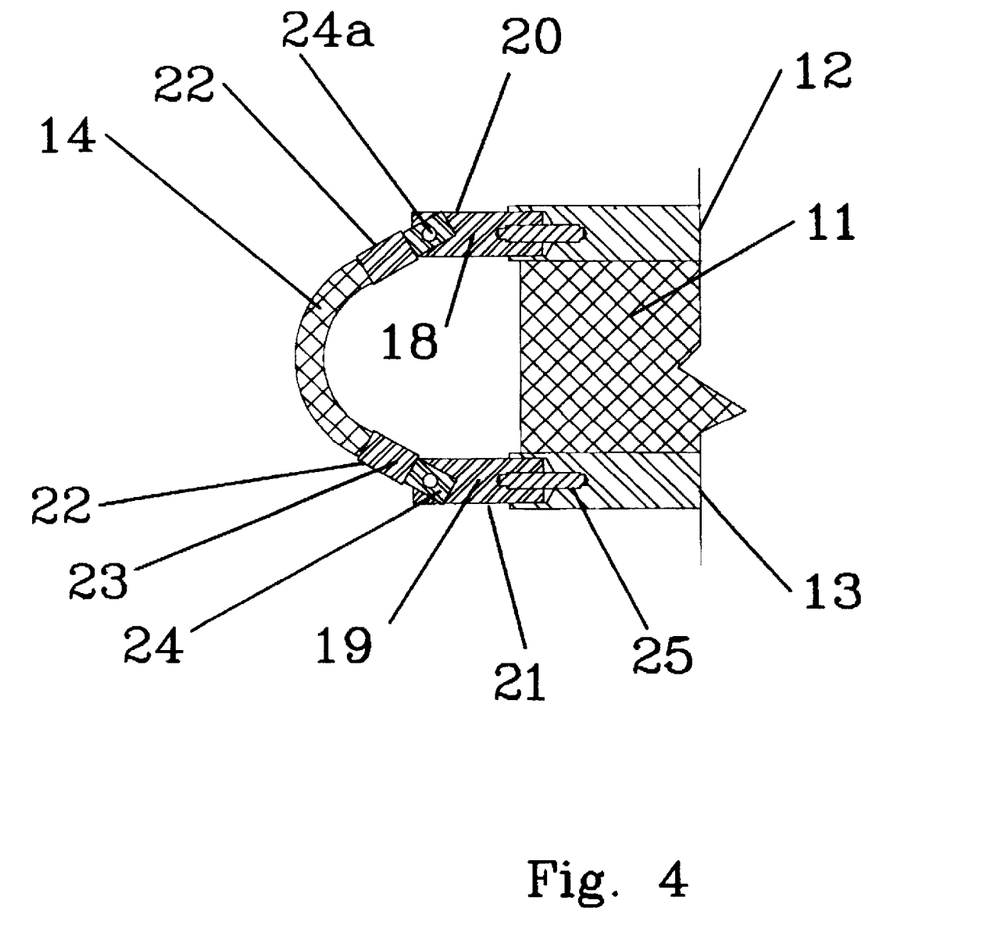
FIG. 4 is a partial vertical cross-sectional view illustrating in greater detail another embodiment of the tension damping attachment.

Referring now to FIG. 4 illustrated therein is a more detailed embodiment of another manner of attachment. Generally, the TDD is attached via upper 20 and lower joints 21 that are free to pivot about at least two axes. A metal fitting device 22 is attached to each end of the TDD. Metal fitting devices 22 include external collars 23 which fit tightly around and is crimped to the each end of the TDD 14. Additionally, the metal fittings include stems 24 which extend past the end of the element, typically several inches. The actual joints 20 and 21 comprise a bored hole in the stems 24, as well as each of the upper 18 and lower 19 pivots; each hole adapted to receive a cross pin bolt 24a which pivotably secures the TDD 14 in place. Lastly, the upper 18 and lower 19 pivots are aligned vertically one above the other and are secured or anchored within the upper 12 and lower 13 load bearing plates, respectively, in a suitable manner, e.g., through the use of a threaded rod 25.

Figures 5, 5A:
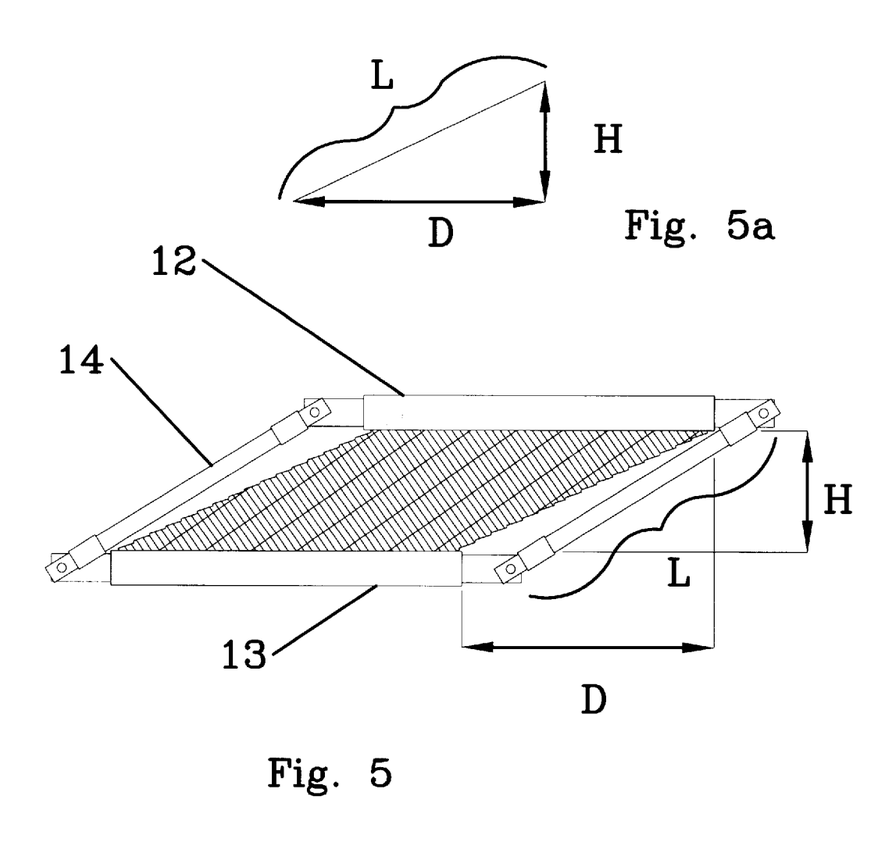
FIG. 5 is a vertical cross-sectional view of a seismic isolation bearing and its associated tension damping devices in an activated position.
FIG. 5A is a exploded view of the FIG. 5 triangle formed by the activation of the bearing's TDD.

The advantage of this type of pivoting joint is that it allows initial single curvature geometry for easy installation of the TDD, as well as providing for a smooth transition from an initial arcuate shape to straight line as the element becomes activated as illustrated by FIG. 5. Furthermore, kinks in the TDD are avoided and the force applied to the TDD and the fitting is a simple axial force.

Referring again to FIG. 5 and to FIG. 5A, activation of any TDD occurs when its pivot-to-pivot length becomes equal to the hypotenuse of a triangle L defined by the pivot-to-pivot height H and predetermined activation point or distance length D. In other words, an activation distance which is less than the ultimate translation capacity of the core is first chosen. For a given pivot-to-pivot height H, the required pivot-to-pivot length of the tension damping device is then calculated using the triangular relationship described above.

Figure 6:
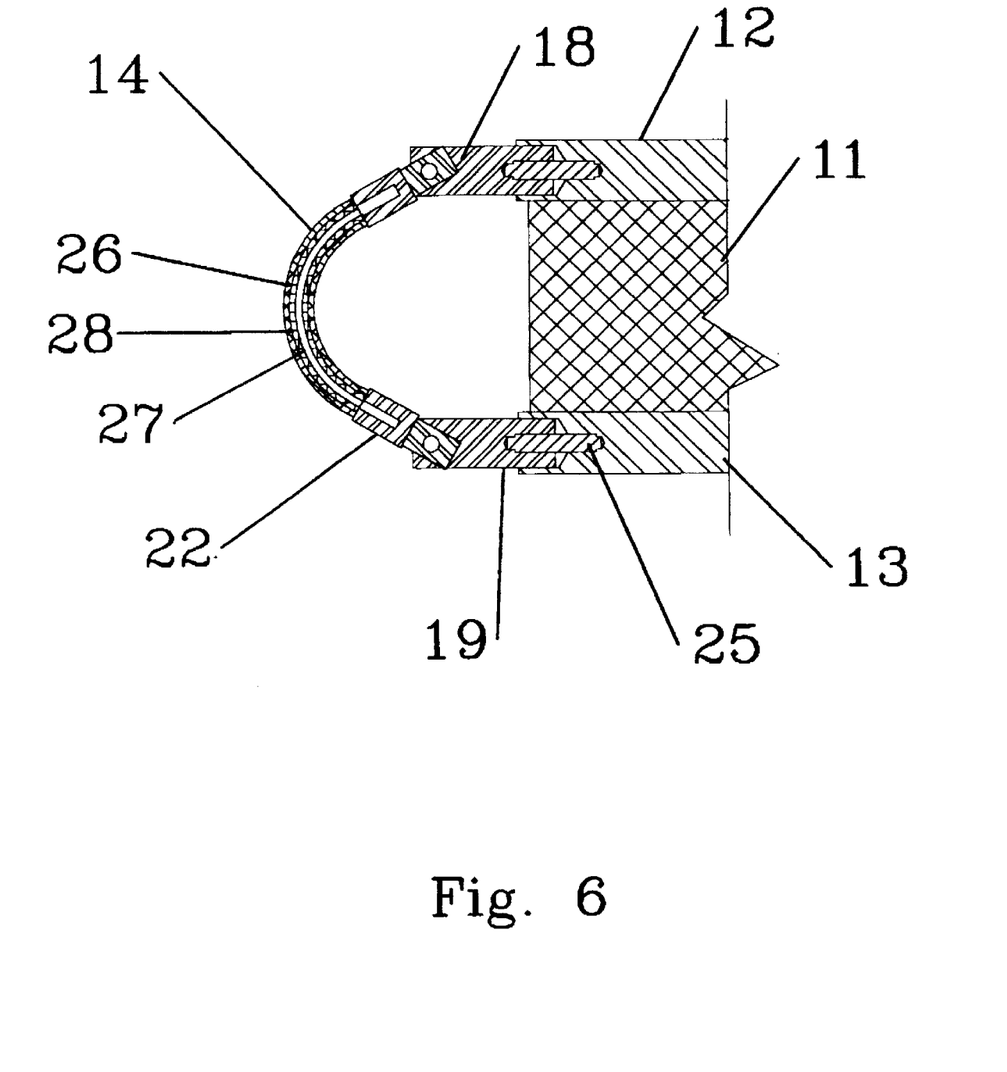
FIG. 6 is a partial vertical cross-sectional view of a seismic isolation bearing and an associated TDD of a preferred shape.
Figure 7:
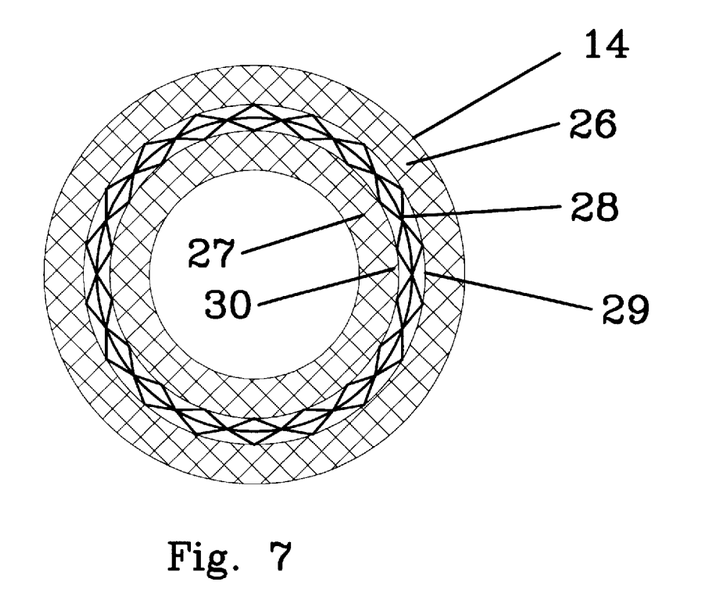
FIG. 7 is a horizontal cross-sectional view illustrating a preferred shape of the TDD.

In one embodiment, the TDD is a cylindrical body; more preferably, a hollow cylindrically body. The cylinder should exhibit an external diameter between about 0.5 inches and 4.0 inches and an inner diameter between about 0.25 inches and 3.5 inches. Referring now to FIG. 6 illustrated therein is a partial view of a seismic isolation bearing 10 having attached thereto another embodiment of a hollow cylindrical body shaped TDD. TDD 14 is comprised of two hollow cylindrical matrix material bodies 26 and 27 having different diameters and a reinforcing material 28 disposed between an inner circumferential surface 29 of the larger hollow cylinder 26 and the outer circumferential portion 30 of the smaller hollow cylinder 27; see also FIG. 7.

The advantage of disposing the reinforcing material between the matrix material cylinders is that it provides protection for the reinforcing material, as well as providing for a maximum bonding surface area between the reinforcing material and the surrounding matrix material. Multiple layers of reinforcing and matrix material are contemplated and may be included within the cylinder geometry.

In another embodiment the reinforcing material is disposed on an inner circumferential surface of the cylindrical body with optionally, the hollow center being filled with additional energy damping material. Alternatively, the reinforcing material may also be disposed on the exterior of the matrix material cylinder.

The reinforcing material may take the form of spirals or braids of individual wires which are embedded in and bonded to the matrix material such that they at least partially move with the matrix material when the TDD is stretched.

The reinforcing braids or spirals are comprised preferably of metal wire between 0.004 and 0.06 inches diameter, and more preferably high-strength, cold drawn wire between 0.01 and 0.02 inches diameter, as well as, brass coated wires because of their superior elastomer bond characteristics.

In another embodiment of the present invention, the tension damping device may be pre-tensioned during installation so as to exert an initial compressive force on the bearing.

Figure 8:
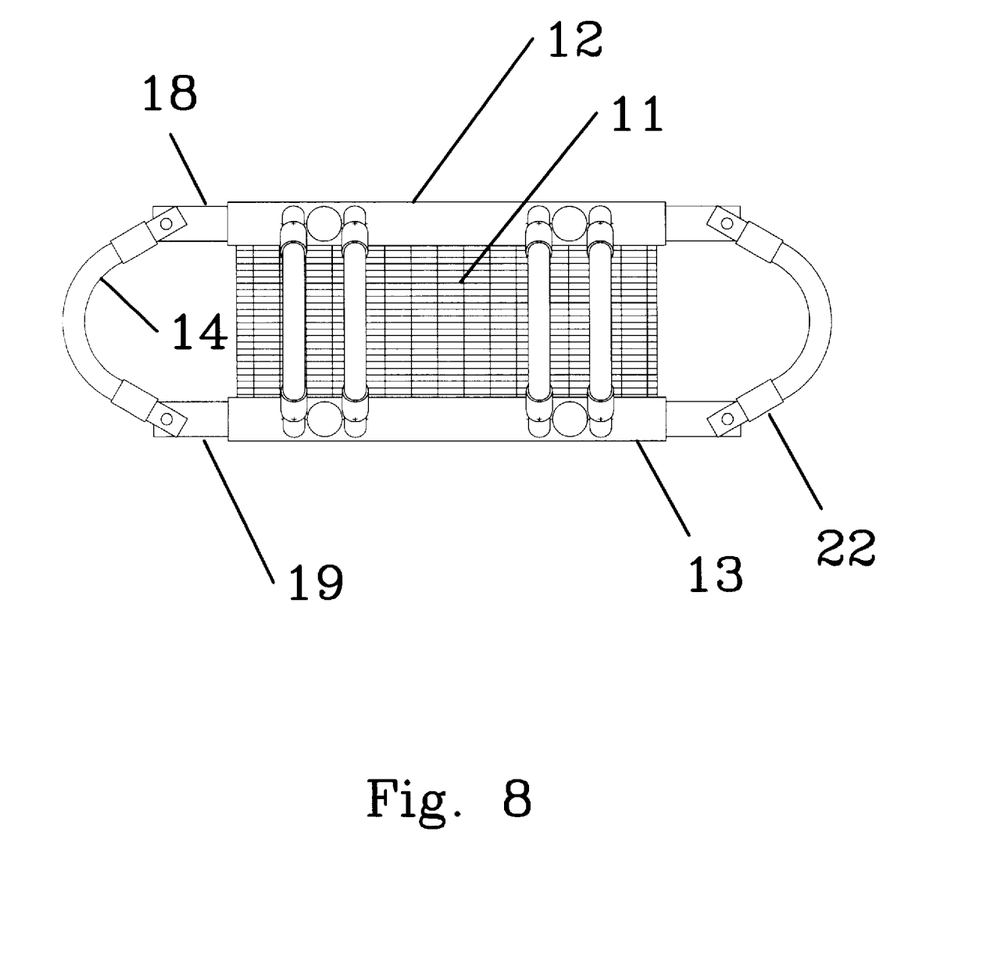
FIG. 8 is a vertical cross-sectional view of another embodiment of the inventive bearing and associated tension damping device.
Figure 8A:
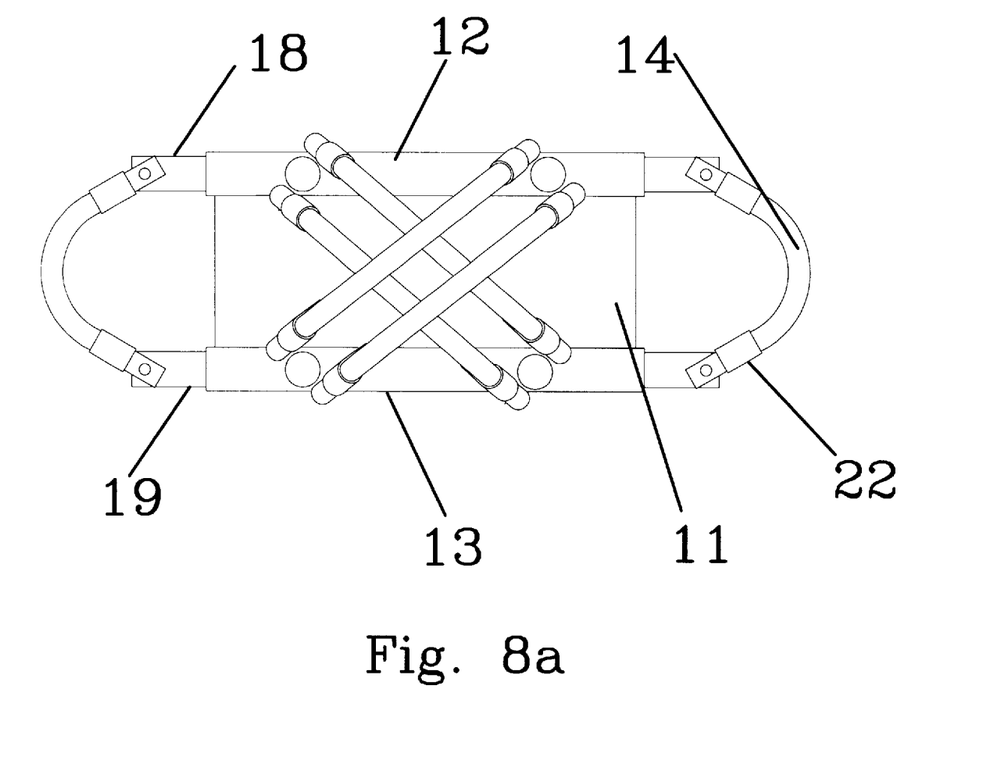
FIG. 8a is a vertical cross-sectional view of another embodiment of the inventive bearing and associated tension damping device.
Figure 9:
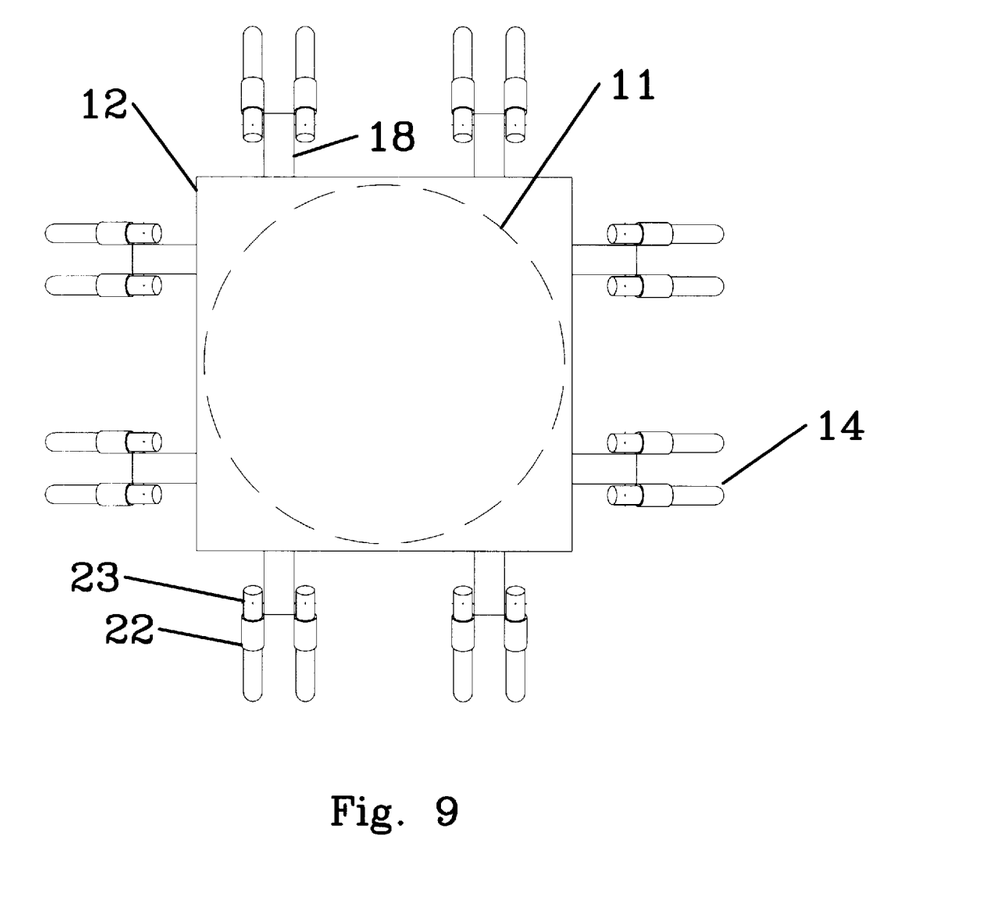
FIG. 9 is a top plan view seismic of the isolation bearing illustrated in FIG. 8.

Illustrated in FIGS. 8 and 8a are two further embodiments of the seismic isolation bearing of the present invention; see also FIG. 9 which is an elevational view of the bearing embodiment of FIG. 8. The bearing 10, in either embodiment, is similar to that bearing in FIG. 1 and utilizes the universal joint attachment 20 embodiment detailed in FIG. 4, except that the bearings comprise a plurality of symmetrically arranged tension damping devices 14 each comprising a pair of cylindrical bodies attached to opposing sides of the upper 18 and lower 19 bearing pivots. Hence, like parts for FIG. 8 and 8a are identified with the same reference numerals used for the parts of the bearings detailed in FIGS. 1 and 4. The strength and stiffness of the actual bearing may be increased by increasing the number of TDD's. Although, the arrangement of TDD's is preferably symmetric, it may be asymmetric in some cases. If the pivots at each end of the TDD are offset horizontally, as illustrated in FIG. 8a, the bearing will then exhibit varying stiffening and damping properties depending on the direction of translation.

Figure 10:
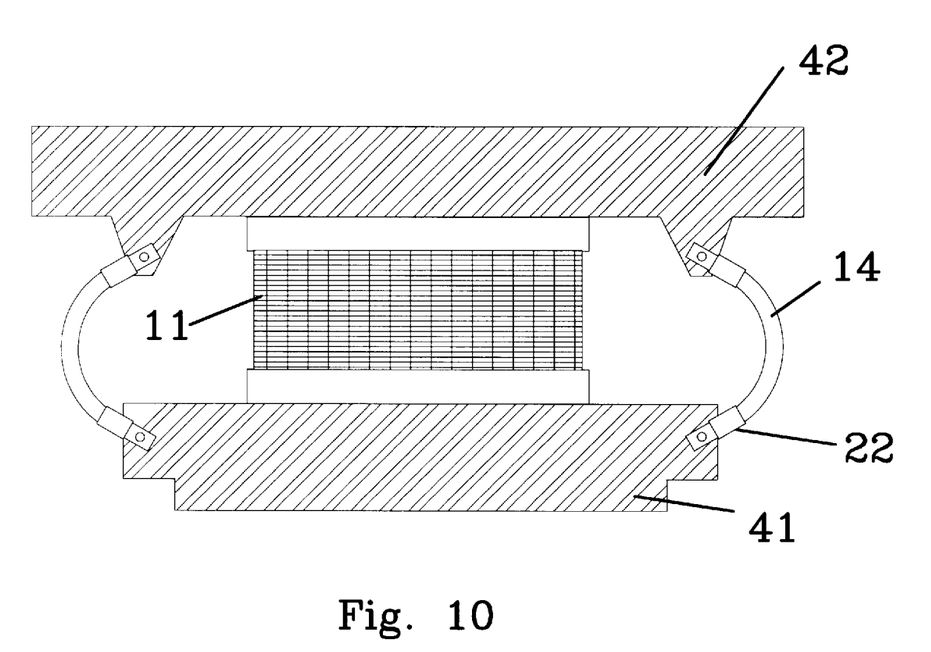
FIG. 10 is a vertical cross-sectional view of a another embodiment of a seismic isolation bearing and associated tension damping device.

Referring now to FIG. 10, the tension damping device may, alternatively, be pivotably attached directly to the structure base 41 at one end, and directly to a point on the structure 42 at the other, separate and apart from the bearing core 11. All other operational characteristics of the tension damping assembly are the same as previously discussed, therefore, like parts as detailed above are identified with the same reference numerals used for the parts of the bearings and the TDD.

The function of the any TDD is controlled by following eight desirable operating characteristics:

Firstly, the ultimate strength or maximum force in the element before failure may be adapted to suit a wide variety of bearings and preferably ranges between 500 to 50,000 pounds.

Second, the maximum elongation in the element at the maximum force, i.e., the maximum elongation, may also be adapted to suit a wide variety of bearings; preferably in the range of 10 to 20 percent.

Third, a variable activation point as detailed above and referred to in relation to FIG. 5. Prior to reaching the activation point the TDD's extend and rotate without contributing any appreciable restraining force on the bearings. For example, if the elements are installed without any curvature or, in other words, as straight vertical elements, the TDD arc length is the height of the bearing, and they become active as soon the bearing is subject to any shear displacement. The initial activation distance in this case is 0. If the tension damping devices are installed as semi-circular arcs, the TDD's arc length is about 3 times the pivot-pivot height H and the activation distance D is about 2.8 times the pivot-to-pivot height. Distance may also be expressed as a percent of bearing elastomer height and is then referred to as strain.

Figure 11:
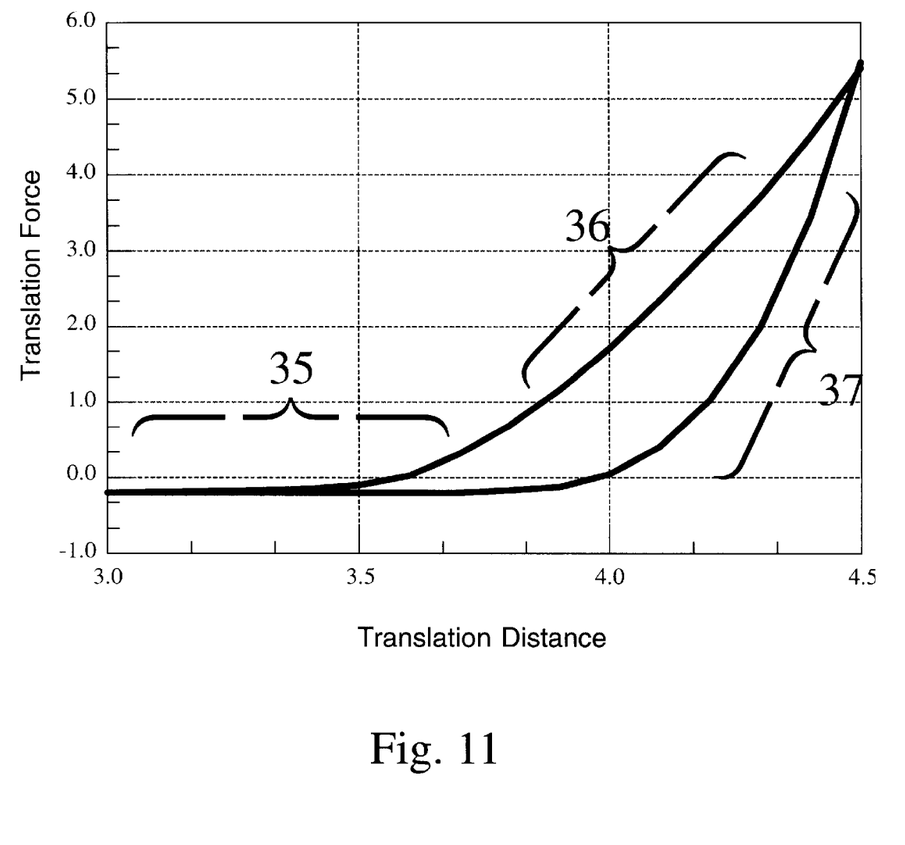
FIG. 11 is a graph of the tension deformation properties of the TDD.

Fourth, the activation range or the distance between the activation point and the point at which the TDD itself has reached its ultimate elongation. The active range is related to the maximum elongation and bearing height and may vary between 10 and 200 percent of the bearing shear strain Fifth, a smoothly and continuously characteristic, after engagement, as detailed in FIG. 11. The TDD in general shows three different regions of behavior: (1) relatively flexible response to loading 35, followed by; (2) a relatively stiff response 36; and thereafter, (3) an unloading response similar to the load response but offset. The area between the offset curves is damping energy. The amount of damping energy per cycle may be expressed as an equivalent amount of viscous damping and as a percent of critical damping. Damping values vary between 5 and 50 percent. Based on the ultimate elongation, the rate of stiffness change may be represented by a stiffening ratio, defined as the change in force during the last half of element elongation, divided by the change in force during the first half of the element elongation. The stiffening ratio may vary between 2 and 50.

Sixth, the tension damping devices have a substantially recoverable operational range, defined by recovery within a time span of one minute. However, elongation of the elements past a certain point will result in some unrecoverable deformations. The ratio of TDD length increase at the maximum elastic elongation, divided by the original unstretched length is referred to as the elastic elongation. These values may be in the range of 20 to 150 percent.

Seventh, the elongation characteristics of the TDD rely in part on contractions around the hollow or filled core. As the cylinder elongates its diameter decreases. The contraction ratio is the ratio of the change in the outside diameter of the TDD at ultimate elongation, compared to the unactivated outside TDD diameter, divided by the unactivated outside TDD diameter. Contraction ratios may vary between about 0.1 and 0.8

Lastly, as the tension damping devices are stretched and relaxed, their internal forces are time and path dependent.

The inventive bearing described herein having as its means for displacement control the TDD, improves on previous displacement controlled bearings as follows: 1) the TDD gradually stiffens thereby avoiding transmitting sudden impacts as may occur with cable, rod or chain means; 2) the TDD provides damping energy losses; 3) the TDD has a recoverable and repeatable stiffening factor; 4) the TDD has an adjustable activation point and range; 5) the TDD behavior is more predictable because it is based on the simple operational principal of axial force; 6) the TDD may be easily tested, installed, serviced and detached.

The suitability of the present invention is hereinafter illustrated by way of an Example. However, the present invention is not restricted to this example and the following non-limiting example is presented to more fully illustrate the invention.

EXAMPLE

This example illustrates the application of composite restraints to elastomeric bearings for a building designed using guidelines of the Uniform Building Code 1994 edition Near-field seismic ground motions may contain a few large displacement pulses. For near-field type ground motion the objective is to insure that the isolation bearing continues to support the vertical load by preventing shear displacements greater than approximately ¾ of the bearing diameter. However, for a given earthquake, these pulses may affect only a few percent of the total affected buildings. For more typical oscillating ground motion, which affects the majority of buildings affected by an earthquake and which is prevalent at distances greater than about 2 miles from the fault, the objective is to reduce structure accelerations as much as possible by providing the most flexible isolation bearing. An optimum isolation design as detailed below can be achieved by designing the bearing for maximum flexibility and using tension damping devices to limit the maximum displacement.

A 2 foot diameter elastomeric bearing was designed for average expected column loads of 240 kips and an earthquake from a nearby fault expected to generate an seismic force greater than Richter Magnitude 8. The target period for the isolation system was 3 seconds and the maximum design displacement was 18 inches. Sixteen layers of ⅜ inch thick, 40 psi shear stiffness elastomer, bonded to 0.10 inch thick metal layers made up the bearing core with the desired vertical and horizontal stiffness.

High pressure (10,000 psi) hydraulic hoses were utilized as the tension damping devices for this application. The composite tubes or cylinders were elastomer materials bonded, during elastomer cure, to embedded continuous metal wires arranged in 4 spiral layers; wire diameters were approximately 17 mils.

Eight TDD's each comprising a pair of the aforementioned composite cylinders and having a combined ultimate strength of 180 kips, which, together with the bearing core combined to exhibit a lateral force of 50 kips at eighteen inches displacement, provided a total lateral bearing resisting force of 220 kips or approximately 100% of the bearing vertical load. The arc length of the TDD was 10 inches and the total length of the tension damping assembly, including fittings, was 18 inches. The TDD activation range was between 14 and 18 inches or between 230 and 300 percent shear strain. Other tension damping device characteristics included: 1) an ultimate elongation of approximately 40 percent; 2) a stiffening ratio of approximately 10; 3) a damping of approximately 20 percent; 4) an elastic elongation of approximately 30 percent; and, 5) a contraction ratio of approximately 2.

A metal fitting was attached to each end of the TDD consisting of a circular shaft that fit tightly into an annular space in the end of the cable, and projected several inches past the end of the TDD. An external collar was crimped over the outside of the TDD at each end. The elastomer was stripped from the wires within the fitting to strengthen the connection against pull-out.

Figure 12:
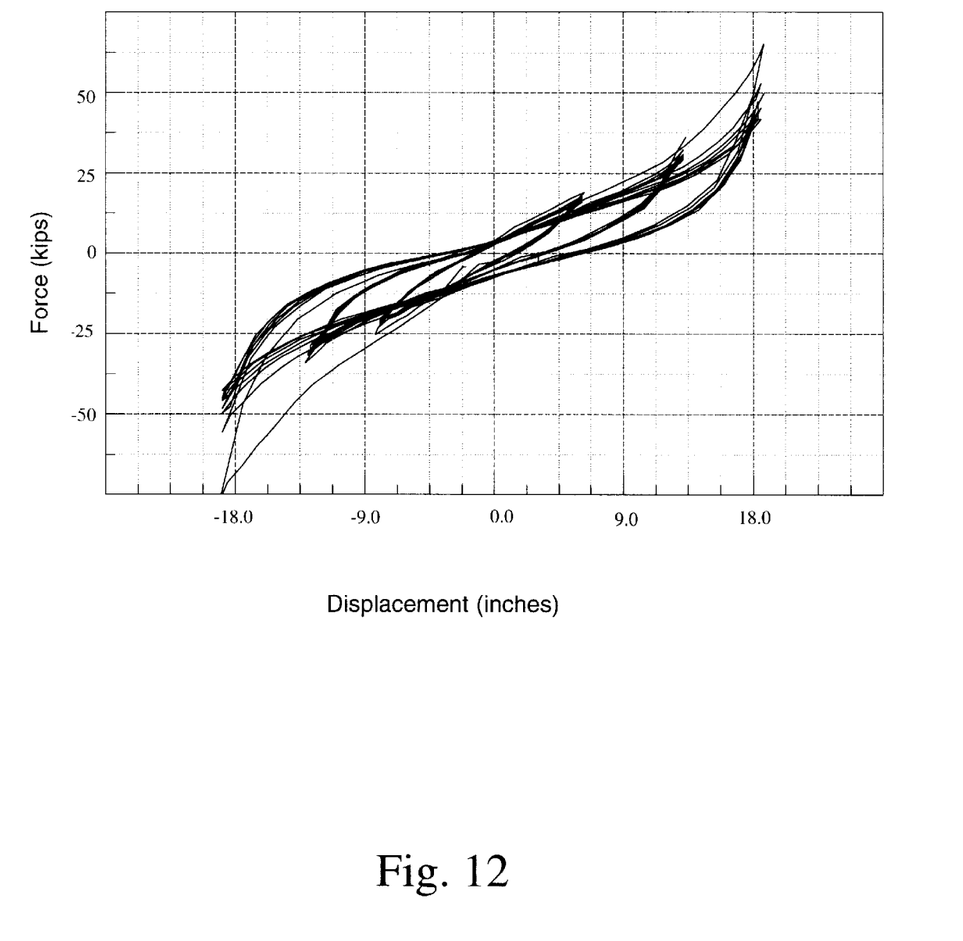
FIG. 12 is a graph of the cyclical shear deformation properties of a conventional bearing core.

Referring now to FIG. 12, it is seen that a conventional bearing having no associated TDD and subjected to the shear force greater than 50 kips exhibited bearing translations past 18 inches which ultimately would lead to bearing instability.

Figure 13:
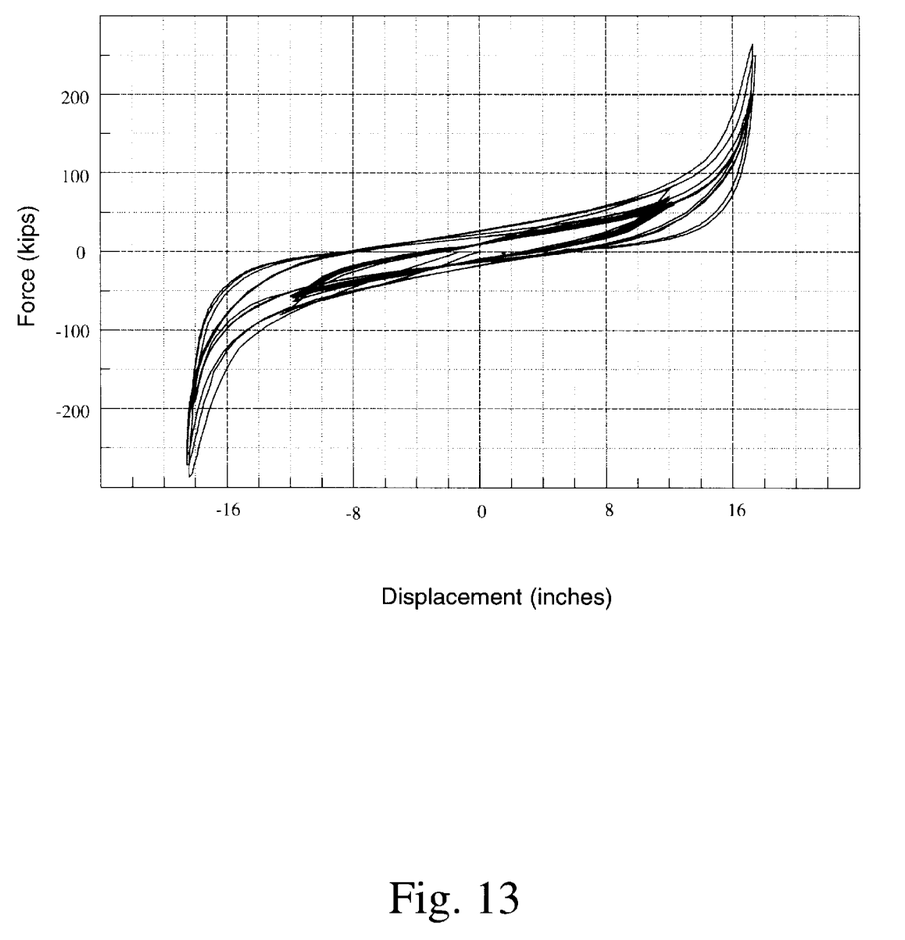
FIG. 13 is a graph of the cyclical shear deformation properties of a bearing core and an associated TDD.

Referring now to FIG. 13, it is seen that the behavior of the bearing, with associated TDD's, outside of the activation range is unaffected. Specifically, a force of over 200 kips is required to advance this inventive bearing, as detailed in the Example above, past 18 inches. Furthermore, damping energy loss is increased. These data demonstrate that the TDD's are effective in optimizing the performance of seismic isolation bearings.

It will be appreciated from the foregoing description that although the preceding detailed description of the invention is focused principally on such seismic metal/elastomer isolation bearings designed for use in high shear environments, it is contemplated that the description relates to all translating isolating bearings. As such, the description herein relates to equipment anti-vibration bearings, and impact reducing bearings, as well, e.g., expansion bearings for thermal movement in large structures, expansion bearings for isolation of structures from environmental vibrations other than earthquakes and equipment vibration isolation bearings. Lastly, although certain preferred embodiments have been shown and described in detail, it should be understood that various changes and modifications may be made without departing from the scope of the appended claims.

What is claimed is:

1. A seismic isolation bearing having an ultimate translational length and capacity for supporting an upper structure on a lower structure, comprising:
    a load bearing core for absorbing forces which cause a horizontal sliding movement between the upper structure and the lower structure;
    an upper load bearing plate positioned on a top surface of the load bearing core;
    a lower load bearing plate positioned on a bottom surface of the load bearing core;
    at least a pair of tension damping devices comprising a matrix material and having a reinforcing material disposed therewithin, the devices connected between the upper load bearing plate and the lower load bearing plate and for damping and stiffening the sliding movement between the upper and lower structures.

2. A seismic isolation bearing according to claim 1 wherein the load bearing core is a laminated metal/elastomer composite comprising alternately layered elastomer and metal substrate bodies having a layer of adhesive disposed therebetween.

3. A seismic isolation bearing according to claim 1 wherein the tension damping devices exhibit an arcuate shape.

4. A seismic isolation bearing according to claim 1 wherein each of the tension damping devices is attached to the upper and lower bearing plates via pivotable joints having at least two axes of rotation.

5. A seismic isolation bearing according to claim 1 comprising a plurality of tension damping devices.

6. A seismic isolation bearing according to claim 1 comprising a plurality of tension damping devices oriented to provide varying damping and stiffening in different horizontal directions of translation.

7. A seismic isolation bearing according to claim 1 wherein each of the tension damping devices comprises a cylindrical body.

8. A seismic isolation bearing according to claim 7 wherein the cylindrical body is hollow and the reinforcing material is disposed on an inner circumferential surface of the cylindrical body.

9. A seismic isolation bearing according to claim 7 wherein the cylindrical body comprises two hollow cylindrical bodies having different diameters and a reinforcing material disposed between an inner circumferential surface of the larger cylinder and the outer circumferential portion of the smaller cylinder.

10. A seismic isolation bearing according to claim 1 wherein the reinforcing material exhibits an elastic modulus and strength of at least 5 times greater than that of the matrix material.

11. A seismic isolation bearing according to claim 10 wherein the matrix material comprises a natural or synthetic rubber.

12. A seismic isolation bearing according to claim 10 wherein the reinforcing material comprises metal strands of a metal selected from the group consisting of steel, iron, copper, aluminum, brass, tin and alloys of the metals.

13. A seismic isolation bearing according to claim 10 wherein the reinforcing material comprises non-metal strands of a material selected from the group consisting of kevlar, nylon, fiberglass, polypropylene, orlon, rayon and mixtures of the materials.

* * * * *